(12) United States Patent
Wang

(10) Patent No.: US 7,314,255 B2
(45) Date of Patent: Jan. 1, 2008

(54) STRUCTURE OF WHEEL RIM COVER

(75) Inventor: Ming-Fang Wang, Tainan Hsien (TW)

(73) Assignee: Kuan Hsings Enterprise Corp., Tainin Tsien (TW)

( * ) Notice: Subject to any disclaimer, the term of this patent is extended or adjusted under 35 U.S.C. 154(b) by 26 days.

(21) Appl. No.: 11/230,475

(22) Filed: Sep. 21, 2005

(65) Prior Publication Data

US 2006/0066145 A1  Mar. 30, 2006

(30) Foreign Application Priority Data

Sep. 30, 2004  (TW) .............................. 93215498 U

(51) Int. Cl.
*B60B 7/12* (2006.01)

(52) U.S. Cl. .............................. 301/37.33; 301/37.102

(58) Field of Classification Search ........... 301/37.101, 301/37.102, 37.31–37.34, 37.42
See application file for complete search history.

(56) References Cited

U.S. PATENT DOCUMENTS

| 2,157,960 | A | * | 5/1939 | Lyon | 301/37.34 |
| 2,522,271 | A | * | 9/1950 | Horn | 301/37.34 |
| 2,567,142 | A | * | 9/1951 | Barker | 301/37.34 |
| 5,845,973 | A | * | 12/1998 | Chase | 301/37.43 |
| 6,517,168 | B1 | * | 2/2003 | Van Houten | 301/37.42 |
| 6,663,189 | B2 | * | 12/2003 | Enomoto et al. | 301/37.36 |
| 7,147,289 | B2 | * | 12/2006 | Nakamura | 301/37.28 |

* cited by examiner

*Primary Examiner*—Jason R. Bellinger
(74) *Attorney, Agent, or Firm*—Bacon & Thomas, PLLC

(57) ABSTRACT

The invention structure of wheel rim cover includes: a cover body whose disc surface has a plurality of spokes separated by openings; many fasteners are set on an outer edge of a rearward end hole of each opening. The fasteners are grouped surrounding the end hole of a same opening, and are jointly supported by a spring ring. The whole cover body can make use of the fasteners to latch on the end hole of the opening of a targeted wheel rim to fasten the cover body on the wheel rim.

7 Claims, 5 Drawing Sheets

(A-A)

STRUCTURE OF WHEEL RIM COVER

BACKGROUND OF THE INVENTION

1. Field of the Invention

This invention relates to a structure of wheel rim cover, especially for the wheel rim cover whose appearance is similar to the wheel rim outer surface and whose structure is suitable for covering on the outer surface of the wheel rim, positioned for mounting via on the wheel rim.

2. Description of the Related Art

The traditional steel rim for mounting car tires has been replaced by aluminum alloy rim gradually. Traditional steel rims normally have a convex-concave reinforcing design disc outer surface. However, aluminum alloy rims are usually made by pressing aluminum alloy material as a whole body, and processing the body to the designed shape. Normally, for saving aluminum alloy material, the outer surface would be formed with many esthetic spokes and openings between the spokes. For covering a bad-looking surface, a traditional steel rim would have many wheel cover designs for covering its surface. Normally, the wheel cover covered on the rim has different design from that of the rim. As shown on the FIG. 1, mainly, fasteners 11 which sit at the back side of the disc 1 and are supported by spring ring 12 are used to engage up the inner circumference edge 14 of a specific concave arc of the rim 13. However, since an aluminum alloy wheel rim has its own esthetic features, a wheel cover would not normally be used.

Nevertheless, because an aluminum alloy wheel rim is made as a single body formed from aluminum alloy, after being hit by a flying stone run over by a speeding car, scrapes will make the rim lose its shiny appearance. The only solution is to replace the four aluminum alloy wheel rims. This is costly. The traditional wheel cover of a steel wheel rim is not suitable for being adopted on the aluminum alloy wheel rim, since there is no specific concave inner circumference edge for supporting the fasteners on the wheel cover.

One design of an overlay, called electroplate skin, has been adopted on the jeep or station wagon wheel rim, which is bigger and has a sunken surface, such as the case of U.S. Pat. No. 5,845,973, titled "Method for compensating for tolerance variations between an overlay and wheel assembly". It is formed by plastic and electroplated with shiny surface covering material. By means of adhesive applied between covering material and the surface of a steel wheel rim or aluminum alloy wheel rim which is to be covered, the covering material can stick on the wheel rim and the electroplated surface of the covering material can decorate the wheel rim. This method is pretty ideal, but the processes needs professional techniques and equipment; general drivers cannot implement the job. Besides, after being treated with adhesive between covering material and the surface of wheel rim, when the covering material is scraped, the covering material would not be able to be disassembled. This means that only one time of replacement can be done. Hence, the practicability is not ideal.

SUMMARY OF THE INVENTION

The objective of this invention is to provide an improved structure of a wheel rim cover, that includes a cover body which has a disc surface and an outer rim edge formed on the circumference edge of the disc surface, and spokes or ribs defined by openings, the openings narrowing from a front of the rim cover rearward and forming a curved surface along the spoke edges. Each opening forms an end hole at the rear side of the cover body. Fasteners are disposed near the end hole of one or more of the openings, and a group of the fasteners are arranged on the rear side of the cover body surrounding the end hole one or more of the openings. The group of fasteners are jointly supported by a spring ring. By means of above structures, the whole cover body can make use of the fasteners which are jointly surrounding outside of the end hole of a same opening to latch on a corresponding end hole of the opening of the targeted wheel rim and fasten the whole cover body on the wheel rim.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENTS

Figure 1:
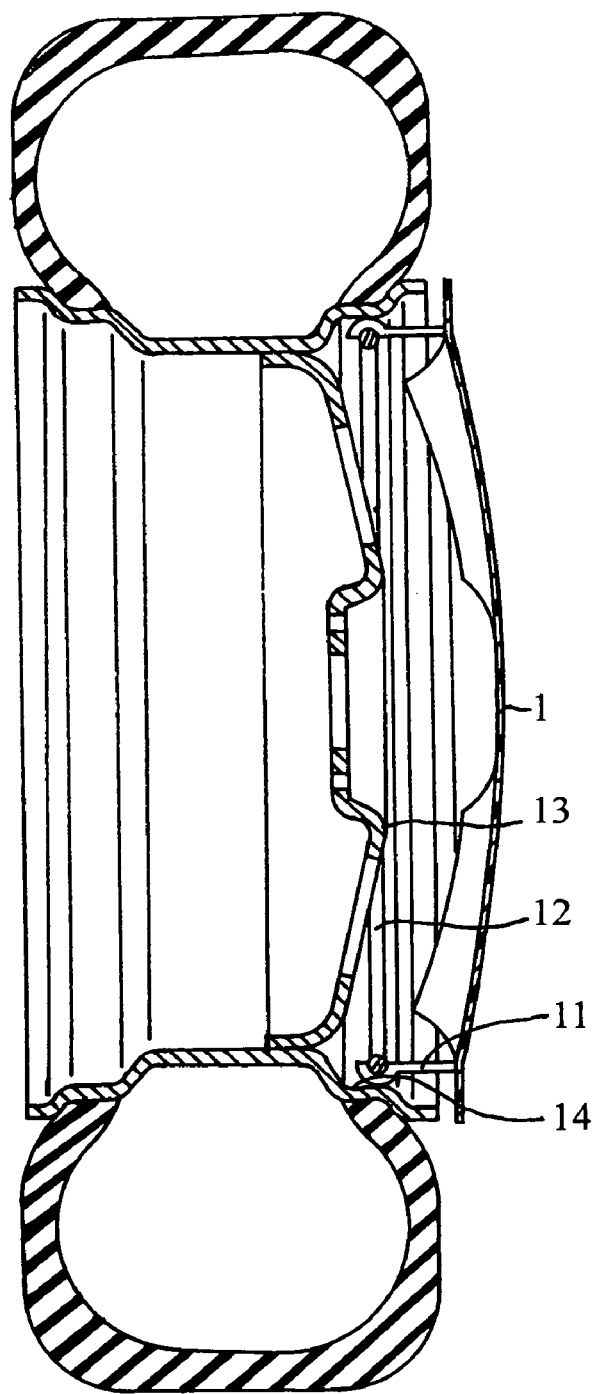
FIG. 1 is a cross-section diagram of the well-known wheel rim fastening cover.

In the detailed description of the preferred embodiments, it should be noted that like elements are indicated by the same reference numerals throughout the disclosure.

Figure 2:
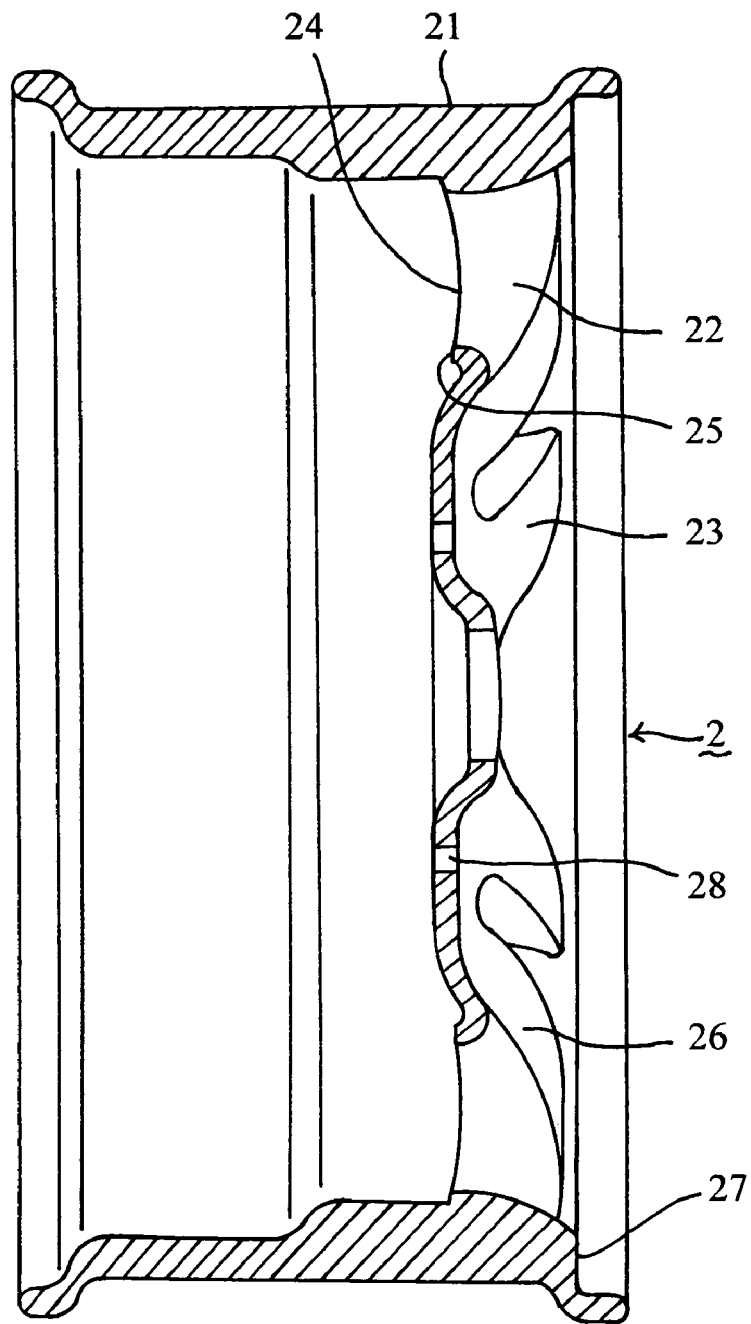
FIG. 2 is a cross-section diagram of the structure of a aluminum alloy wheel rim.

Referring to FIG. 2, the invention preferred embodiments can be adopted on the wheel rim 2 shown on the figure. The invention preferred embodiment has an outer rim 21 for mounting a tire and openings 22 and disc 23. Each opening 22 has specific shape and narrows from an outer point (front surface) of the wheel rim 2 toward an inner part (rear), and has an end hole 24 at the inner side of the wheel rim 2. Latch edge 25 is formed at the outer circumference edge of the end hole 24. Spokes or ribs 26 are formed between every two openings 22. A mount seat 27 is formed at the outer circumference edge of the wheel rim 2. Securing holes 28, for accommodating bolts to mount the wheel rim 2 to a wheel hub, are set on the disc 23.

Figure 3:
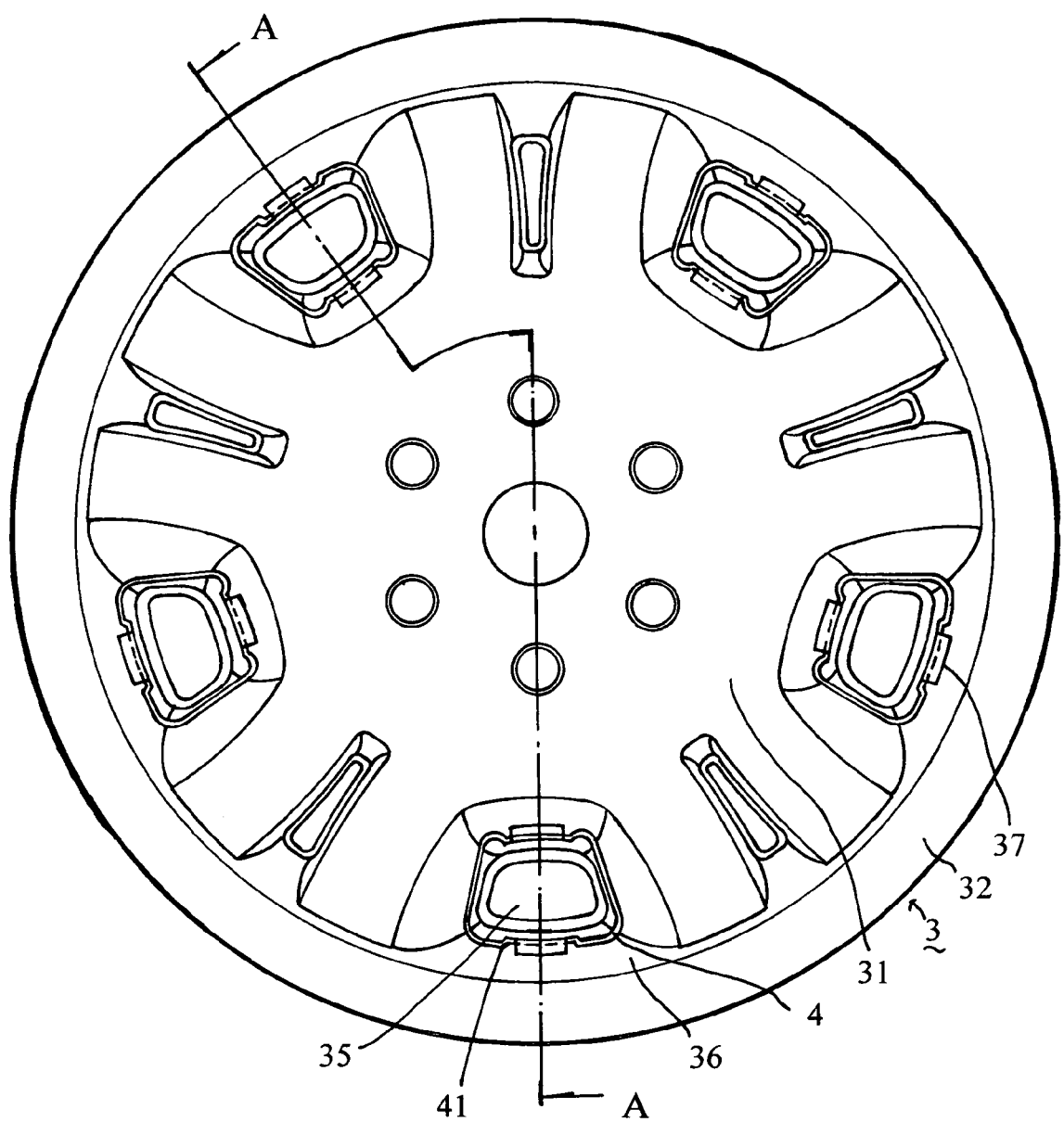
FIG. 3 is a backside structure diagram of the invention preferred embodiments.
Figure 4:
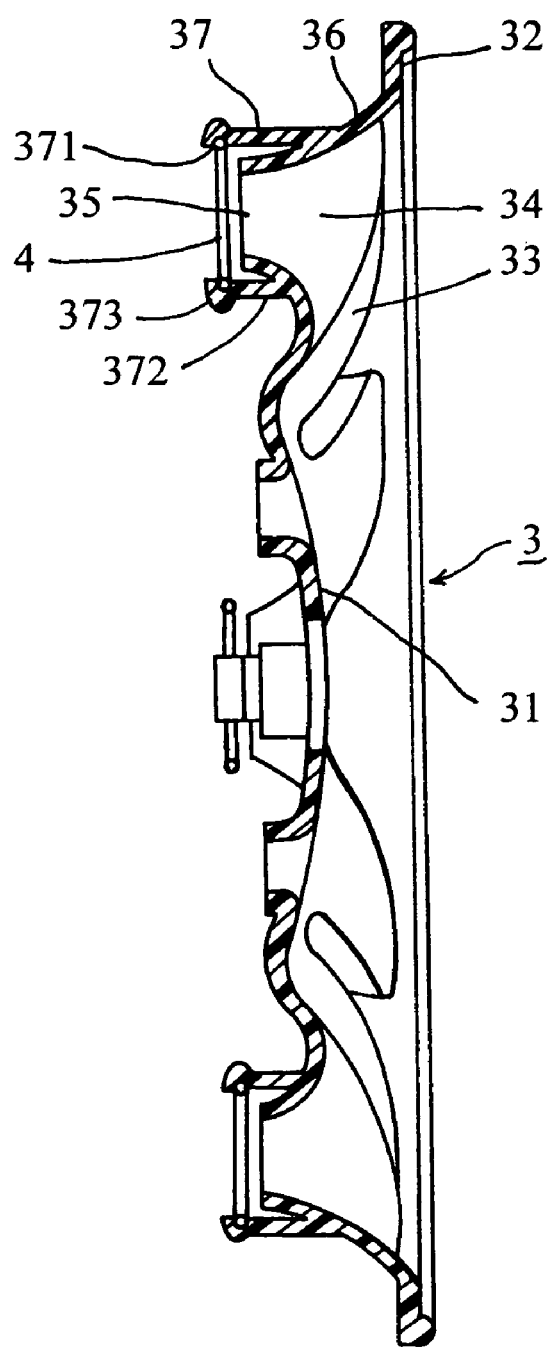
FIG. 4 is a section diagram of section A-A of FIG. 3 of the invention preferred embodiments.

Referring to FIGS. 3-4, a wheel rim cover of a preferred embodiment includes:

a cover body having a disc 31. A peripheral edge 32 is formed at the circumference edge of disc 31; a plurality of ribs or spokes 33 are provided and separated by openings 34 formed between every two of the spokes 33. Each opening 34 has specific shape and is narrows from an outer or front part of the cover body toward an inner or rear part of the cover body. Each opening 34 forms an end hole 35 at the inside of the cover body 3; the shape of each spoke 33 and opening 34 is similar to the shape of each spoke 26 and opening 22 of the targeted wheel rim 2. Openings 34 form a hole edge 36 of the spokes 33 having a curved surface. Fasteners 37 are disposed near end hole 35 around the outer side of hole edge 36; two fasteners 37 are grouped around at the hole edge 36 of the end hole 35 of the same opening 34. Each end of the fasteners of a same group of fasteners 37 facing the end hole 35 is provided with a concave groove 371, and each fastener 37 has a stem with suitable length between the hole edge 36 and the groove 371. The fastener 37 is integrally formed with the cover body 3; each fastener can have different setting up position, interval and amount, relying on the different shape of opening 34 and end hole 35. In the case of the invention preferred embodiment, since end hole 35 is, roughly, a rectangle, fasteners 37 would be set up at hole edge 36 sit at both sides of end hole 35. A protrusion 373 is formed at a side of each fastener 37, in opposition to groove 371.

Spring rings 4, which are made of steel thread and encircled to be a specific annularity, matching the shape of above mentioned end hole 35 of the opening 34 of the cover body 3, can be inserted into groove 371 of a group of the fasteners 37 corresponding to end hole 35, and can offer a force to outwardly urge the protrusion 373 of fastener 37. The spring rings 4 are set in the fasteners 37 firmly. The shape of the other part of the spring ring 4 follows the shape of end hole 35 of the opening 34 of the cover body 3, but is slightly bigger.

Figure 5:
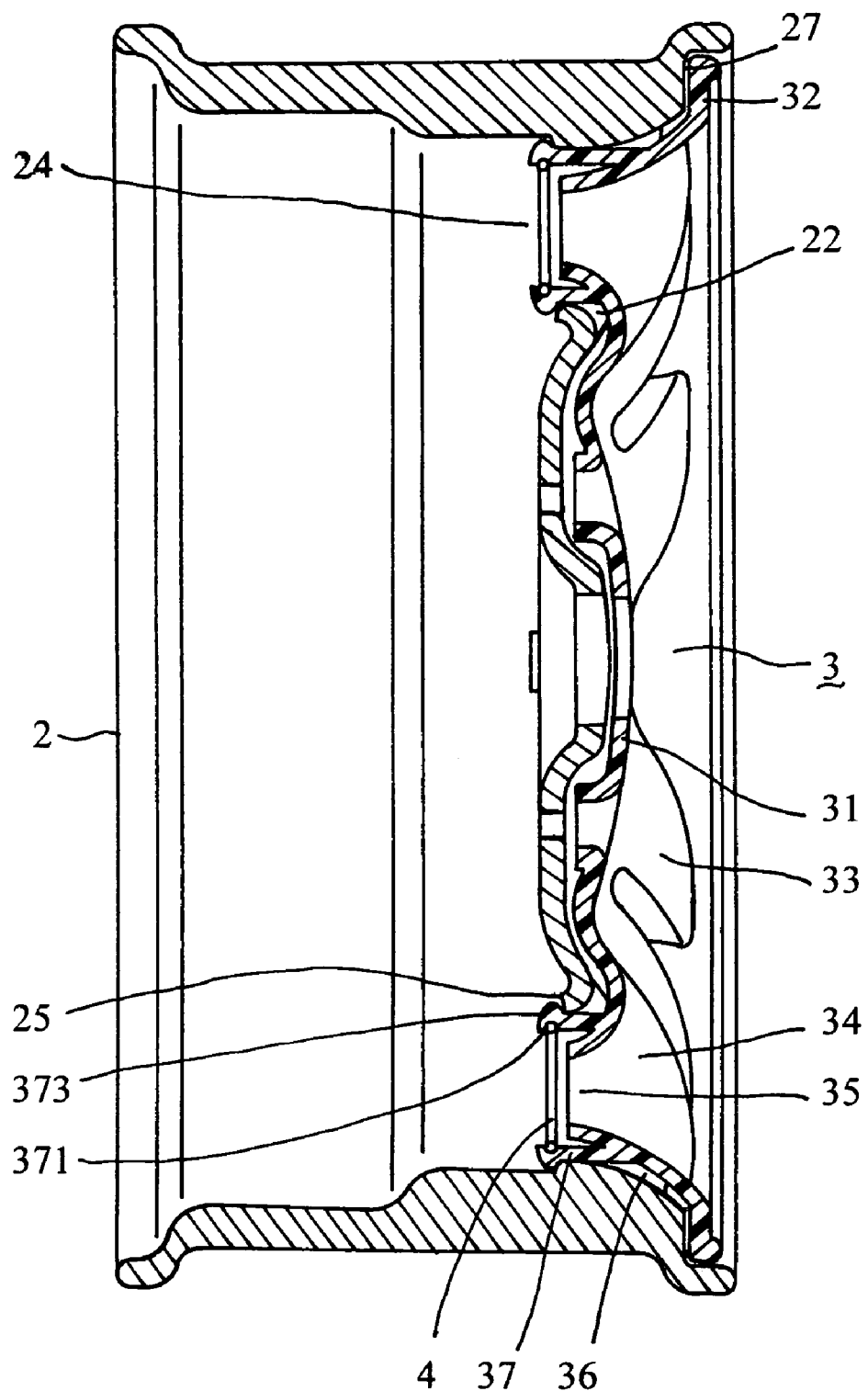
FIG. 5 is a cross-section diagram of the invention preferred embodiments installed on the aluminum alloy wheel rim of FIG. 2.

Painting or electroplating can be performed on the disc 31 of the cover body 3 for polishing the surface. In assembly, each spring ring 4 can be inserted in the grooves 371 of the fasteners of a same group of fasteners 37 in advance; then, as shown in FIG. 5, the cover body 3 is attached onto surface of wheel rim 2 to set cover body 3 peripheral edge 32 inclining to seat 27 of the wheel rim 2 outer rim and make spokes 33 on the cover body 3 cap the spokes 26 of the wheel rim 2. In addition, each group of fasteners 37, inserted with a spring ring 4, on cover body 3 is inserted through end hole 24 of opening 22 of wheel rim so that the protrusions 373, urged outward by spring rings 4, of each group of fasteners 37 engage and latch to the latch edge 25 of end hole 24 of each opening 22 of wheel rim 2 to complete the processes for attaching cover body 3 on wheel rim 2.

According to a preferred embodiment, the projection 373 on each of the fasteners 37 has enough capacity for latching the latch edge 25 of end hole 24 of each opening 22 of wheel rim 2 to fix cover body 3 in position. Hence, each spring ring 4, inserted in each group of fasteners 37 to increase the latching function of each group of fasteners 37 on the latch edge 25 of the end hole 24 of each opening 22 of the wheel rim 2, is only for increasing the latching strength.

According to another preferred embodiment, each group of fasteners 37 set on the outer hole edge 36 of the near end hole 35 of each opening 34 of cover body 3 is arranged for making the spring ring 4, inserted in the grooves 371 of the fasteners of each group of fasteners 37, be bigger than end hole 35 of each opening 34 of cover body 3 to avoid the spring ring 4 being visible in the end hole 35 of engraved hole 34. In the meanwhile, when each group of fasteners 37 is set on the hole edge 36 of the opening 34, this can offer each fastener 37 a suitable-length stem 372 from the hole edge 36 to the groove 371 set with spring ring 4 to increase the flexibility of spring ring 4.

According to another preferred embodiment, 2 fasteners 37 form a group to surround the same outer hole edge 36 of end hole 35 of an opening 34 and accommodate a same spring ring 4. The end hole 35 can also be shaped to set more than 2 fasteners as a group for surrounding on the same outer hole edge 36 of end hole 35 of opening 34 and jointly accommodating the same spring ring 4. Referring to the invention preferred embodiments, the latching processes, for latching each group of fasteners 37 of cover body 3 in the latch edge 25 of end hole 24 of openings 22 of wheel rim 2, can be selective. This means that it is not necessary that every outer hole edge 36 of near end hole 35 of every opening 34 of cover body 3 has a group of fasteners, for example: if there are 5 openings 34 on cover body 3, a triangle configuration of 3 openings may be provided with fasteners 37 to be configured for latching. Of course, all openings 34 may be provided with fasteners 37 to be configured for latching. Assembly is an easy operation and no professional knowledge or device is needed. Every driver can complete it easily. The processes of latching cover body 3 on an aluminum alloy wheel rim without applying any adhesive would affect nothing, if an old cover body 3 is removed for replacement with a new one.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A structure of a wheel rim cover, comprising: a cover body having a disc surface and an outer rim edge formed on a circumferential edge of the disc surface, and a plurality of spokes separated by openings, each opening narrowing from a front of the cover body rearward to from hole edges defining curved side surfaces of the spokes, each opening terminating at an end hole at a rear side of the cover body; a plurality of fasteners disposed near the end hole of one or more of said openings, wherein the fasteners form a group arranged on the rear side of the cover body surrounding the end hole of one or more of the openings, each group of fasteners being supported by a spring ring; wherein the fasteners are configured to latch on an end hole of an opening of a targeted wheel rim to fasten the cover body on the wheel rim.

2. A structure of wheel rim cover as claimed in claim 1, wherein the shape of every spoke and opening of the wheel rim cover is similar to the shape of every spoke and opening of the targeted wheel rim.

3. A structure of wheel rim cover as claimed in claim 1, wherein the fasteners of each group of fasteners are each provided with a groove on a side of the fastener facing the end hole for accommodating said spring ring.

4. A structure of wheel rim cover as claimed in claim 1, wherein said each fastener has a suitable-length stem from the hole edge to the groove.

5. A structure of wheel rim cover as claimed in claim 1, wherein said fasteners are integrally formed with the cover body.

6. A structure of wheel rim cover as claimed in claim 1, wherein a projection is formed at a side of the fastener opposite to the groove.

7. A structure of wheel rim cover as claimed in claim 1, wherein a shape of the spring ring is similar to a shape of the end hole of the opening of the cover body, the spring ring having a diameter slightly larger than that of said end hole.

* * * * *